(12) United States Patent
Ben-Yishay et al.

(10) Patent No.: US 10,436,653 B2
(45) Date of Patent: Oct. 8, 2019

(54) SELF-CALIBRATION OF A RADIOMETRIC IMAGER

(71) Applicant: International Business Machines Corporation, Armonk, NY (US)

(72) Inventors: Roee Ben-Yishay, Haifa (IL); Dan Corcos, Tel Aviv (IL); Danny Elad, Moshav Liman (IL); Shraga Kraus, Haifa (IL)

(73) Assignee: International Business Machines Corporation, Armonk, NY (US)

(*) Notice: Subject to any disclaimer, the term of this patent is extended or adjusted under 35 U.S.C. 154(b) by 260 days.

(21) Appl. No.: 15/453,923

(22) Filed: Mar. 9, 2017

(65) Prior Publication Data

US 2018/0259402 A1   Sep. 13, 2018

(51) Int. Cl.
*G01K 15/00* (2006.01)
*G01K 11/00* (2006.01)

(52) U.S. Cl.
CPC .......... *G01K 15/005* (2013.01); *G01K 11/006* (2013.01)

(58) Field of Classification Search
CPC .... G01K 11/006; G01K 13/02; G01K 15/005; G01K 15/007
USPC ........................................................ 342/351
See application file for complete search history.

(56) References Cited

U.S. PATENT DOCUMENTS

| 5,438,336 A | 8/1995 | Lee et al. |
| 5,815,113 A | 9/1998 | Lo et al. |
| 7,304,297 B1 | 12/2007 | King et al. |
| 9,018,582 B2 | 4/2015 | Sarkis |
| 2003/0123056 A1* | 7/2003 | Barnes ................. A61B 5/0059 356/300 |
| 2008/0056086 A1* | 3/2008 | Kuroda ................ G11B 7/1267 369/53.26 |
| 2015/0371431 A1* | 12/2015 | Korb ........................ G06T 9/00 382/113 |

OTHER PUBLICATIONS

Tedeschi et al., "A Novel Passive Millimeter Imager for Broad-Area Search", Dec. 2011.

(Continued)

*Primary Examiner* — Dao L Phan
(74) *Attorney, Agent, or Firm* — Dvir Gassner (57) ABSTRACT

A method for internal calibration of a detector comprising using one or more hardware processors for the following actions. The method comprises an action of receiving a request for internal calibration of a detector comprising a switchable termination resistor (Dicke switch) and connecting electronically one or more internal calibration circuits to the termination resistor. The method comprises an action of applying two or more input voltage signals to the detector from the calibration circuit and measuring two or more output readings from the detector, each output reading corresponding to one of the input voltage signals. The method comprises an action of computing internal calibration coefficients based on the input voltage signals and the output readings. The method comprises an action of storing the internal calibration coefficients on a non-transitory computer-readable storage medium connected to the hardware processor(s) for subsequent calibration of output values from the detector.

19 Claims, 6 Drawing Sheets

(56) References Cited

OTHER PUBLICATIONS

Alquaied et al., "A Nonlinear Counts to Antenna Temperature Algorithm for a Total Power Radiometer with External Calibration and Noise Diode Injection", Jan. 6-9, 2016, 2016 United States National Committee of URSI National Radio Science Meeting (USNC-URSI NRSM).

Nugent et al., "Radiometric calibration of infrared imagers using an internal shutter as an equivalent external blackbody", Dec. 2014, vol. 53(12), p. (123106-0)-(123106-7), Optical Engineering.

* cited by examiner

SELF-CALIBRATION OF A RADIOMETRIC IMAGER

BACKGROUND

The invention relates to the field of radiometric imaging.

Radiometric imagers may use an active or passive scanning technique. Active imagers project electromagnetic radiation at an object and scan the reflected radiation with a detector. Spatial information of the scanned image may be produced by deflecting the electromagnetic radiation, moving the detector, or both. Passive imaging systems may create images using ambient radiation and radiation emitted from the object(s), such as using a staring detector array at the focal plane. Optionally, passive imaging systems use scanning technologies. As used herein the term detector refers to a sensor for a single image pixel, such as a detector of a scanning imager, a detector of a staring array, a detector of a line scanner, or the like.

Radiometric imagers may use calibration to improve computed images, such as improving accuracy of pixel values, reducing noise, correcting for aberrations, and/or the like. Calibration may be performed using an external image/object that may produce an image with known pixel values, and computationally correcting the measured pixel values to match the known ones. Calibration may be performed using an internal signal/radiation source that produces known pixel values, and computationally correcting the measured pixel values to match the known ones.

Passive imagers may use a Dicke switch, to switch between each array element and an inline resistance to ground. This may also be called a switchable resistance. For example, Dicke microwave radiometers determine the temperature of the microwave background radiation better than conventional radiometers, such as better calibrating high frequency signals. For example, Dicke switches are used to increase the accuracy and stability of calibrations, such as calibration of internal noise sources.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a method for internal calibration of a detector. The method comprises using one or more hardware processors for the following actions. The method comprises an action of receiving a request for internal calibration of a detector comprising a switchable termination resistor (Dicke switch). The method comprises an action of connecting electronically a calibration circuit to the termination resistor. The method comprises an action of applying two or more input voltage signals to the detector from the calibration circuit. The method comprises an action of measuring two or more output readings from the detector, each output reading corresponding to one of the input voltage signals. The method comprises an action of computing internal calibration coefficients based on the input voltage signals and the output readings. The method comprises an action of storing the internal calibration coefficients on a non-transitory computer-readable storage medium connected to the hardware processor(s) for subsequent calibration of output values from the detector.

According to some embodiments, the method further comprises an action of repeating the actions of claim 1 for computing second internal calibration coefficients. The method further comprises an action of retrieving from non-transitory computer-readable storage medium external calibration coefficients. The method further comprises an action of correcting a detector values by replacing the external calibration coefficients with new calibration coefficients based on the equations:

$$a_{new} = \tilde{\tilde{a}} \cdot \frac{a}{\tilde{a}} \text{ and } b_{new} = \frac{\tilde{\tilde{b}}}{\tilde{a}} \cdot a_{new},$$

where $a_{new}$ and $b_{new}$ denote the with new calibration coefficients, a and b denote the external calibration coefficients, $\tilde{a}$ and $\tilde{b}$ denote the internal calibration coefficients, $\tilde{\tilde{a}}$ and $\tilde{\tilde{b}}$ denote the second internal calibration coefficients.

According to some embodiments, the calibration circuit is a noise source of different power levels for calibration.

According to some embodiments, a normal detector input is electronically disconnected during the measuring.

According to some embodiments, the detector is an element of a staring array.

According to some embodiments, the method is performed for segments of detectors in the staring array.

According to some embodiments, the staring array is a component of a passive radiometric imager.

According to some embodiments, the calibration comprises a correction for detector drifts resulting from gain fluctuations.

According to some embodiments, some of the input voltage signals are noise signals.

There is provided, in accordance with an embodiment, a computer program product for internal calibration of a detector. The computer program product comprises a non-transitory computer-readable storage medium having program code embodied therewith. The program code is executable by hardware processor(s) to receive a request for internal calibration of a detector comprising a switchable termination resistor (Dicke switch). The program code is executable by hardware processor(s) to connect electronically a calibration circuit to the termination resistor. The program code is executable by hardware processor(s) to applying two or more input voltage signals to the detector from the calibration circuit. The program code is executable by hardware processor(s) to measure two or more output readings from the detector, each output reading corresponding to one of the input voltage signals. The program code is executable by hardware processor(s) to compute internal calibration coefficients based on the input voltage signals and the output readings. The program code is executable by hardware processor(s) to store the internal calibration coefficients on the non-transitory computer-readable storage medium connected to the hardware processor(s) for subsequent calibration of output values from the detector.

According to some embodiments, the computer program product further comprises program code executable by hardware processor(s) to repeat the actions of claim 1 for computing second internal calibration coefficients. The program code is executable by hardware processor(s) to retrieve from non-transitory computer-readable storage medium external calibration coefficients. The program code is executable by hardware processor(s) to correct a detector values by replacing the external calibration coefficients with new calibration coefficients based on the equations:

$$a_{new} = \tilde{\tilde{a}} \cdot \frac{a}{\tilde{a}} \text{ and } b_{new} = \frac{\tilde{\tilde{b}}}{\tilde{a}} \cdot a_{new},$$

where $a_{new}$ and $b_{new}$ denote the with new calibration coefficients, a and b denote the external calibration coefficients, $\tilde{a}$ and $\tilde{b}$ denote the internal calibration coefficients, $\tilde{\tilde{a}}$ and $\tilde{\tilde{b}}$ denote the second internal calibration coefficients.

There is provided, in accordance with an embodiment, an imaging system comprising one or more detector comprising a switchable termination resistor (Dicke switch). The imaging system comprises one or more calibration circuit configured to electronically connect to the switchable termination resistor. The imaging system comprises hardware processor(s). The imaging system comprises a non-transitory computer-readable storage medium having program code embodied therewith. The program code executable by hardware processor(s) to receive a request for internal calibration. The program code executable by hardware processor(s) to connect electronically a calibration circuit to the termination resistor. The program code executable by hardware processor(s) to applying two or more input voltage signals to the detector from the calibration circuit. The program code executable by hardware processor(s) to measure two or more output readings from the detector, each output reading corresponding to one of the input voltage signals. The program code executable by hardware processor(s) to compute internal calibration coefficients based on the input voltage signals and the output readings. The program code executable by hardware processor(s) to store the internal calibration coefficients on the non-transitory computer-readable storage medium connected to the hardware processor(s) for subsequent calibration of output values from the detector.

According to some embodiments, the imaging system further comprises program code executable by hardware processor(s) to repeat the actions for computing second internal calibration coefficients. The program code is executable by hardware processor(s) to retrieve from non-transitory computer-readable storage medium external calibration coefficients. The program code is executable by hardware processor(s) to correct a detector values by replacing the external calibration coefficients with new calibration coefficients based on the equations:

$$a_{new} = \tilde{\tilde{a}} \cdot \frac{a}{\tilde{a}} \text{ and } b_{new} = \frac{\tilde{\tilde{b}}}{\tilde{a}} \cdot a_{new},$$

where $a_{new}$ and $b_{new}$ denote the with new calibration coefficients, a and b denote the external calibration coefficients, $\tilde{a}$ and $\tilde{b}$ denote the internal calibration coefficients, $\tilde{\tilde{a}}$ and $\tilde{\tilde{b}}$ denote the second internal calibration coefficients.

According to some embodiments, the calibration circuit is a noise source of different power levels for calibration.

According to some embodiments, a normal detector input is electronically disconnected during the measuring.

According to some embodiments, the detector is an element of a staring array.

According to some embodiments, the program code is executed for segments of detectors in the staring array.

According to some embodiments, the staring array is a component of a passive radiometric imager.

According to some embodiments, the calibration comprises a correction for detector drifts resulting from gain fluctuations.

According to some embodiments, at least some of the input voltage signals are noise signals.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Described herein are systems and methods for calibrating a passive imager system using internal and/or external reference signals. Behavior of each detector of an imager, such as each detector of a staring array, may be modelled by a linear transfer function for example using the equation y=ax+b, where x denotes the power arriving at the detector input from the target, a and b denote polynomial coefficients, and y denotes the pixel value representing its shade. A production calibration includes the action of calibrating an imaging system during production using external calibration at two or more energy levels. The coefficients a and b of each detector calculated from the known pixel value and measured detector value and stored in the imager's system memory. After installation, each pixel of the imager may be calibrated according to the equation:

$$y_{corrected} = y \cdot \frac{a_{ref}}{a} + b_{ref} - b \cdot \frac{a_{ref}}{a} \qquad \text{EQN. 1}$$

where $y_{corrected}$ denotes the corrected value of the pixel, y denotes the pixel value from the detector array, and $a_{ref}$ and $b_{ref}$ denote uniform coefficients.

The production calibration may include the action of internal calibration accompanying the external calibration. The internal calibration uses two reference signals, such as of two or more different power levels, generated within the imager, and by electronically switching the electronic references to the Dicke switch resistor. Each detector element may have polynomial coefficients from the internal calibration, denoted $\tilde{a}$ and $\tilde{b}$, stored in the system memory. When the imager is in use, the detector parameters may drift—either uniformly or randomly—and the image produced by the imager may become noisy. To correct this noise, drift, or the like, a second internal calibration may be performed using the internal reference signals, producing new polynomial coefficients for each pixel, denoted $\tilde{\tilde{a}}$ and $\tilde{\tilde{b}}$. New calibration values are computed using:

$$a_{new} = \tilde{a} \cdot \frac{a}{\tilde{a}} \; ; \; b_{new} = \frac{\tilde{\tilde{b}}}{\tilde{\tilde{a}}} \cdot a_{new}, \quad \text{EQN. 2}$$

where the new calibration values denoted $a_{new}$ and $b_{new}$ are stored in the memory, and used from new image correction using the equation:

$$y_{corrected} = y \cdot \frac{a_{ref}}{a_{new}} + b_{ref} - b_{new} \cdot \frac{a_{ref}}{a_{new}}. \quad \text{EQN. 1}$$

Benefits

Performing an internal calibration may take a short time, since switching electronical sources may be fast compared to mechanical switching. For example, when the imager serves as a streaming video camera, the internal calibration may be carried out during the time of one video frame, with little disturbance to routine operation. Furthermore, mechanical elements for calibration are not needed in the imager, and temperature regulators are not needed, lowering the product cost and increasing reliability. The internal calibration, in addition to external calibration, may facilitate and streamline the design of radiometric passive imagers, as compared to the known technique based on external calibration alone. Enables the implementation a staring passive radiometric imager. These improvements may benefit applications in the healthcare products, radiometer products, millimeter-wave imaging products, or the like.

Staring Array Imagers

Before presenting the details of aspects of embodiments, an overview of the system, methods, and related circuits are described.

Figure 1:
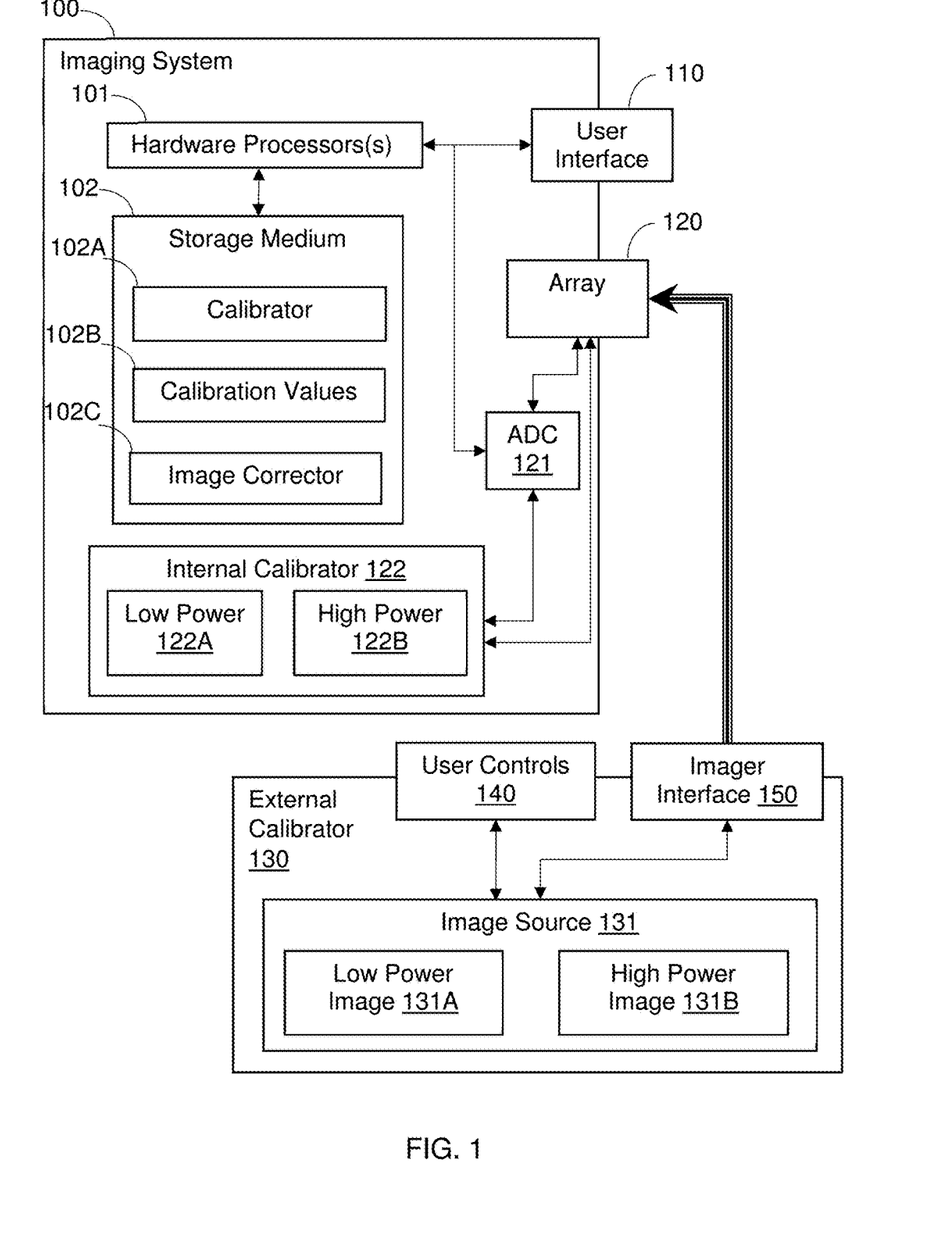
FIG. 1 shows schematically an imaging system with internal and external calibration.

Reference is now made to FIG. 1, which shows schematically an imaging system 100 with internal and external calibration. As used herein, the term imager means a computerized imaging system capable of receiving energy and converting the energy to an image for presentation to a user, further processing, or the like. Computerized imaging system 100 may comprise, optionally with additional standard computer components, one or more hardware processors 101, a user interface 110, a non-transitory computer readable storage medium 102, or the like. The imaging components of imaging system 100 may comprise an imaging array 120 configured to receive energy from an antenna, lens, or other energy collecting device. The imaging components of imaging system 100 may comprise an analog to digital converter (ADC) 121, operationally connected to imaging array 120 and hardware processor(s) 101 thereby converting the electrical voltages and currents produced by array 120 to digital data values and sending the digital data values to hardware processor(s) 101 for reconstructing an image.

The imaging components of imaging system 100 may comprise an internal calibrator 122 which may be operationally connected to ADC 121 with two or more electronic connector switches as part of array 120 and/or ADC 121 electronic circuits so that a low power 122A analog signal and a high power 122B analog signal may be connected to array 120 and/or ADC 121 input for internal calibration of imaging system 100. An external calibrator 130 may comprise user controls 140, an imager interface 150 to supply energy to array 120. Energy may be produced by two or more image source 131 components of external calibrator 130, a low power image 131A source and a high-power image 131B source. Together, internal calibrator 122 and external calibrator 130 may be applied to imaging system 100 to calibrate ADC 121 and array 120 with high accuracy, high reproducibility, low variability, or the like.

Figure 2:
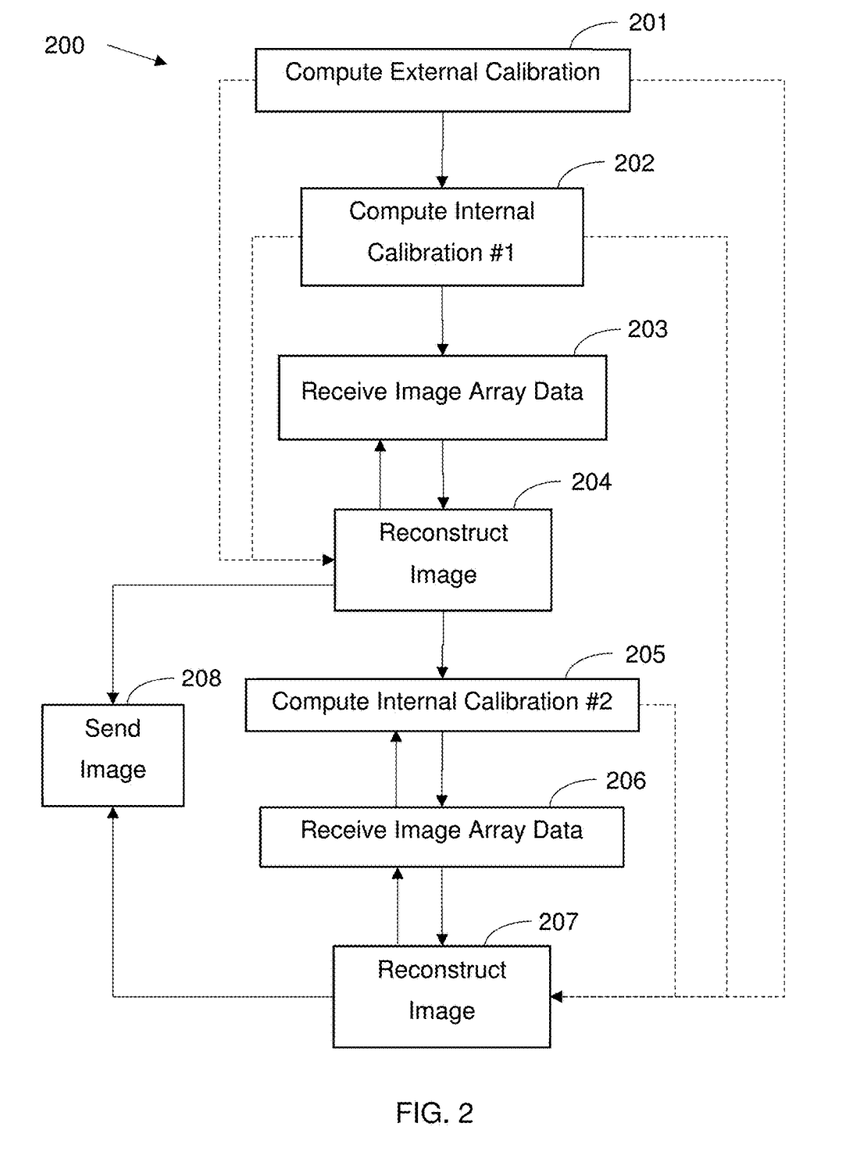
FIG. 2 shows a flowchart of a method for internal and external calibration.

Reference is now made to FIG. 2, which shows a flowchart of a method 200 for internal and external calibration. Method 200 comprises an action of computing 201 an external calibration with two or more external calibrator 130 image sources 131. Method 200 comprises an action of computing 202 a first internal calibration with two or more internal calibrator 130 image sources 131. The computed internal and external calibration coefficients may be applied using EQN. 1 to correct image array data received 203 from array 120 to produce a reconstructed 204 image. Reconstructed 204 image may be sent 208 to a client terminal to present to a user, sent to user interface 110 of imaging system 100 for presentation, sent for further processing, or the like. Actions of receiving 203, reconstructing 204, and sending 208 are repeated as long as image quality is above a threshold. After image quality has been reduced below a threshold, a timer has expired, an image counter has reached a limit, a user has manually requested a recalibration, or the like, a second internal calibration may be computed 205, subsequent image data received 206 may be reconstructed 207 using EQN. 2 and EQN. 3, and the reconstructed image using two internal calibrations may be sent 208 for presentation and/or the like.

Following are further details of the operation of imaging system 100 when applying methods 200 for internal and external calibration. Individual pixel detectors of a staring array may differ from each other in their performance, such as when the imager is looking at a uniform target, the output from each detector may have a different analog and digital values. This phenomenon may result in a noisy image, and internal and external calibration may be used to make the image more accurate, more reproducible, less noisy, and/or the like.

Variations in image pixel values may originate from uneven fabrication of the array's detectors, such as the result of physical limitations of the fabrication process. This type of variation may be calibrated in the factory before delivery to the end user. Variations may be due to random parameter drift of the detectors. Drift variations may appear after installation of the imager, such as after transport, after time has passed, after a certain number of images have been acquired, and/or the like, and may require calibration when the imager is located at the end user facility. Furthermore, detector performance may change with temperature, possibly non-linearly. Variations of the imager circuit performance may also change with temperature.

Calibration before delivery to an end user may be despite complexity and complications, as it may not interrupt end user operation. Internal calibrations, on the other hand, may be performed after the imager has been delivered to the end user, and therefore may be quick and simple so that the internal calibrations avoid interrupting the imager operation.

Image Correction

Figure 3:
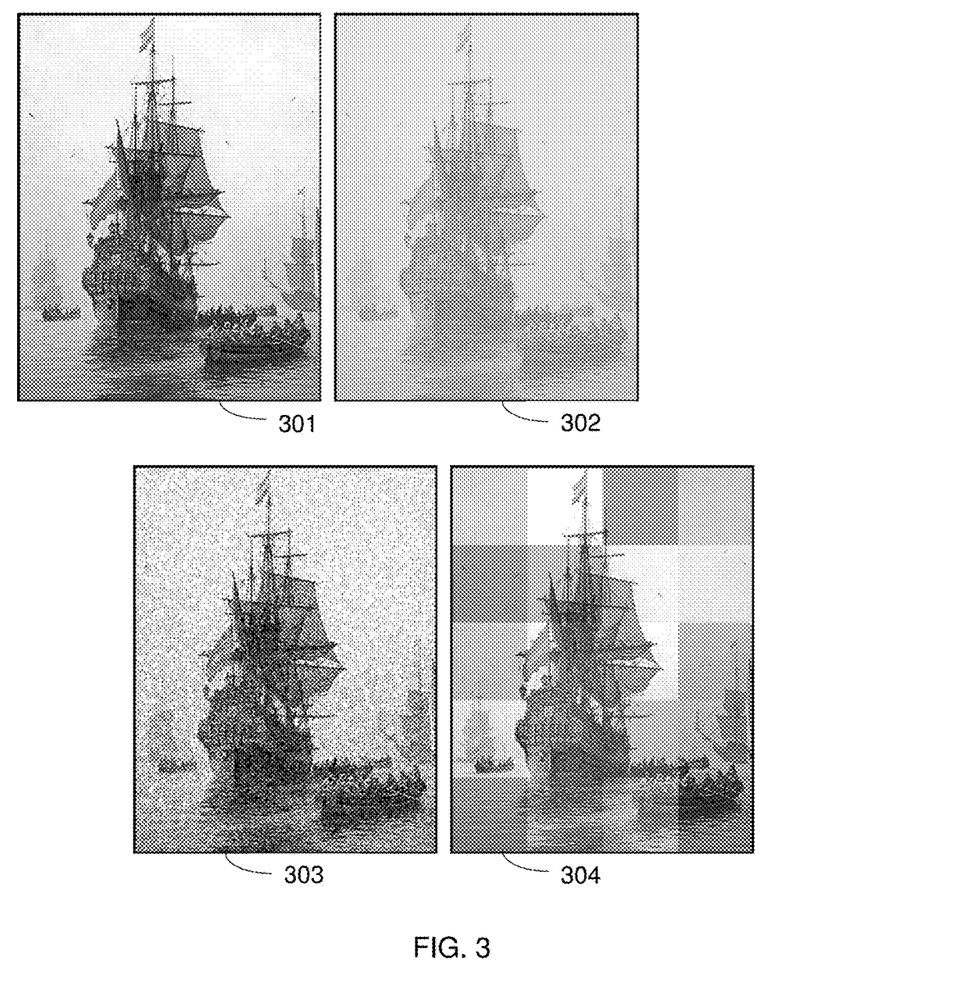
FIG. 3 shows simulated images before internal and external calibration.

Reference is now made to FIG. 3, which shows simulated images before internal and external calibration. A test original image 301 was modified to produce an image with uniform noise 302, random noise 303, and piecewise-uniform noise 304. In images with uniform noise 302, coefficients (a and b) of all array detectors are changed similarly. Uniform noise may be corrected mathematically by adjusting brightness and contrast. Imagers may incorporate built-in uniform noise error correction, such as automatic image equilibrium, to improve the image visually. In images with random noise 303, coefficients of the array detectors differ from each other in a random manner. This effect may not be corrected effectively by mathematical post processing, and calibration may be performed to correct this. For example, a calibration process may correct variations between detectors of a staring array, while uniform variations of all detectors may be corrected by built-in error correction.

Detector arrays may be implemented in a segmented manner, such as when the whole image is divided to several zones. Each zone may be implemented as an independent circuit. Images with piecewise-uniform noise 304 may be corrected using algorithms, such as when the position and size of the piecewise zones are known in advance. Internal calibration techniques may perform well when implemented as a single calibration mechanism serving the whole staring array, when several independent mechanisms are used to calibrate different zones of the array, when each pixel detector of the array is calibrated independently, or the like.

Electronic Circuits

Following are descriptions of circuits for implementing internal calibrations of an imaging system.

Figure 4:
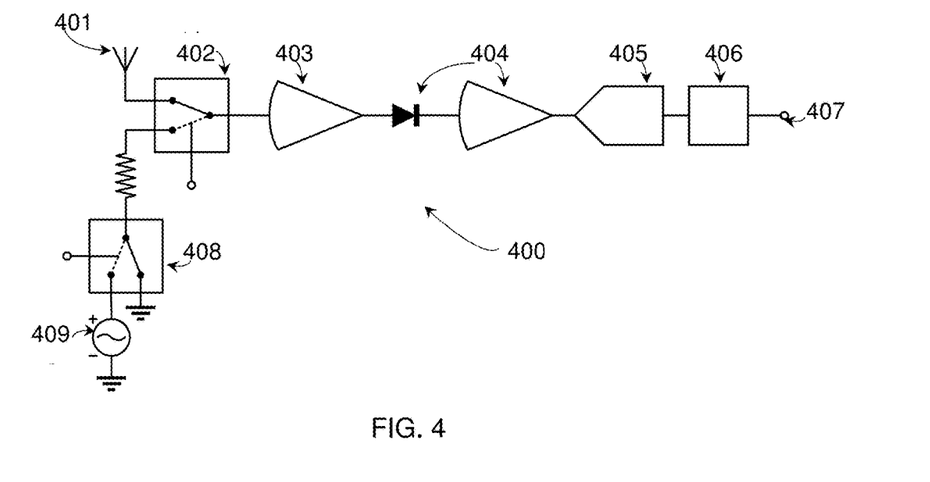
FIG. 4 shows a circuit diagram of a detector with internal calibration.
Figure 5:
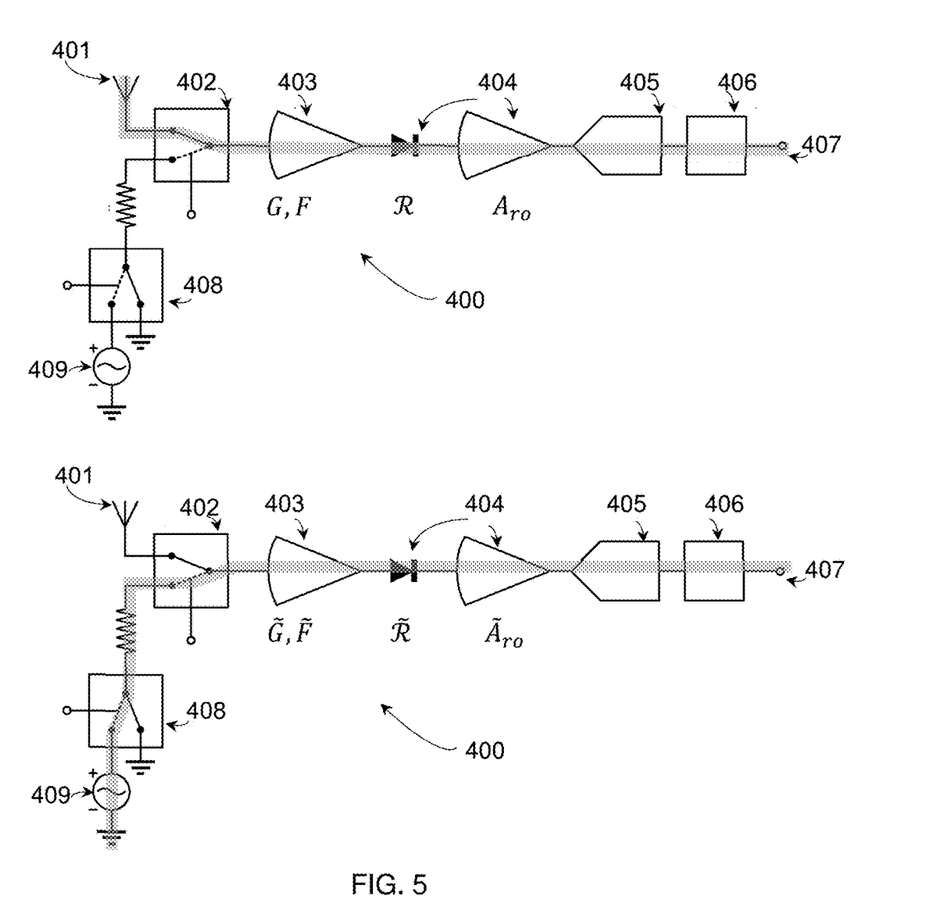
FIG. 5 shows circuit diagrams with electronic connections during normal operation and internal calibration.

Reference is now made to FIG. 4 and FIG. 5, which show a circuit diagram 400 of a detector with internal calibration during different modes of operation. For example, a radiometric receiver with Dicke switches 402, a staring array, and an internal calibrator uses a detector circuit for each element of the array. During normal operation, calibration switch 408 constantly connects the termination resistor to ground. Dicke switch 402 toggles between antenna 401 and the ground, and the system performs as a regular Dicke-switched receiver where antenna 401 signal may be fed into a low noise amplifier (LNA) 403, detector and readout 404, ADC 405, hardware signal processing 406, and sent by digital data connection 407 to hardware processor(s) 101.

In calibration mode, Dicke switch 402 constantly connects the termination resistor to LNA 403. Calibration switch 408 toggles between ground and a reference signal source 409, and acts as a second Dicke switch. Note, that when the reference source is connected, the termination resistor may be connected in series with the source and thus acts as an attenuator. G and $\tilde{G}$ denote the gain up to LNA 403, F and $\tilde{F}$ denote the noise factor up to LNA 403, $\mathcal{R}$ and $\tilde{\mathcal{R}}$ denote the responsivity of detector 404, and $A_{ro}$ and $\tilde{A}_{ro}$ denote the gain of readout 404.

Signal paths in both normal operation and calibration mode are illustrated in FIG. 5. Each path features gain and noise factor (G, $\tilde{G}$ and F, $\tilde{F}$, respectively) from antenna 401 to the output of LNA 403, detector responsivity ($\mathcal{R}$, $\tilde{\mathcal{R}}$), and readout gain ($A_{ro}$, $\tilde{A}_{ro}$).

A reference signal source may be common to all the detectors of the array, or all the detectors in an array segment, in case of segmented implementation. The rest of the circuit, from the calibration switch onwards, may be duplicated in every detector.

The circuit may be further simplified if the termination resistor may be implemented as a matched resistive attenuator. In this case, the calibration switch may be a simpler single-pole single-throw (SP5T) switch that may be common to all detectors.

In both topologies, however, the paths in FIG. 5 differ from each other in passive elements, whereas LNA 403 (an active element) may be common to both G and $\tilde{G}$. Ratio between gains of passive elements tends to remain stable with temperature and ageing. Consequently, this ratio may be accentuated as a uniform noise.

Background

The linear transfer function of a detector may be written as $$y = ax + b \qquad \text{EQN. 3}$$

where y denotes the output of the ADC (a number), x denotes the input power received by the antenna, and a and b denote polynomial coefficients.

The received power may be black body radiation emitted by the target, which may be proportional to the black body's temperature. The active electronic elements of the circuit may generate noise in the detector's output value. This noise may result in an error in the measurement of the target's temperature. Thus, noise may be expressed in units of kelvin, such as the noise-equivalent temperature difference (NETD).

External Calibration

Detectors may differ from each other due to uneven fabrication and parameter drift. Each detector has its own values for a and b. Since the output may be linear with the power emitted by the target, two points are sufficient to find a and b of each detector and calibrate the whole imager. Two uniform targets with different power emission levels (temperatures, in the case of black body radiation) are posed against the imager. This configuration ensures that all detectors receive equal input signals, $x_1$ and $x_2$. The outputs of each detector, $y_1$ and $y_2$, are read and used for the calibration. For example, when $y_1 = a\ x_1 + b$ and $y_2 = a\ x_2 + b$, the calibration parameter values are $a = (y_1 - y_2)/(x_1 - x_2)$ and $b = y_1 - a\ x_1$.

Calibration may be performed in two fashions, analog and digital. Analog calibration involves adjustment of analog properties in the detector circuits until a corrected image is obtained, that is, a and b of all detectors are substantially equal. Digital calibration, on the other hand, may be done by applying mathematical post processing to the non-calibrated output data, as explained hereinafter.

After taking images of the two uniform targets a and b of each detector may be derived from $x_1$, $x_2$, $y_1$ and $y_2$. This per-detector information may be stored in the memory of the imager. In order to get a clear image all detectors may behave as if they had the same a and b. Let $a_{ref}$ and $b_{ref}$ be the desired uniform coefficients. For a given detector reading the corrected reading (or corrected detector output value)

may be computed using EQN. 1, where $y_{corrected}$ is the reading as if the detector featured $a_{ref}$ and $b_{ref}$, while a and b are the actual coefficients of the detector derived from the calibration data. This correction procedure may be applied for each detector right after every acquisition.

An improvement of the external calibration by including a reference target in the lens perimeter. During calibration, the radiation path may be altered optically, and radiation from the reference target arrives at the sensors. Calibration thus becomes simpler and quicker than the classic external calibration.

Internal Calibration

Another calibration includes replacing the SPDT switch (the Dicke switch) with a single-pole 5-throw (SP5T) switch and adding a temperature sensor to the imager. The five terminals of the SP5T switch are connected to: (a) receiving antenna, (b) passive load (as in a regular Dicke switch), (c) active cold load, (d) active hot load, and (e) external reference signal. Measuring the output of a detector when the input may be connected to (c), (d) and (e), together with the system's internal temperature, may provide calibration values.

Scanning Imager

The scanning imager uses a single receiver for generating the image. As a result, the time allocated for the detection of one detector may be $T_{frame}/N_{pixels}$, where $T_{frame}$ denotes the frame time (33 milliseconds for a standard 30 frames/sec video), and $N_{pixels}$ denotes the total number of pixels in the image. For comparison, the detection time of a staring array imager may be $T_{frame}$. The shorter detection time of the scanning imager leaves less time for noise averaging, which deteriorates NETD of the imager.

Another drawback of the scanning detector may be its complex optical-mechanical scanning mechanism.

Calibration Procedure

From this point on we assume that the power received by the antenna is given by $P_{in}=KT_{eq}B$, where K denotes Boltzmann's constant, $T_{eq}$ denotes the equivalent noise temperature, and B denotes the bandwidth of the receiver. $P_{in}$ denotes input power proportional to the target's temperature. Full scale (2×amplitude) of the square wave in normal operation may be given by $$\Delta = T_{eq} \cdot \underline{(KB \cdot G\mathcal{R}A_{ro})} - T_{sys} \cdot \underline{KB \cdot G\mathcal{R}A_{ro}}, \quad \text{EQN. 4}$$
$$y = x \cdot a + b$$

where $T_{sys}$ denotes the temperature of the imager hardware. $\Delta$ becomes zero when $$T_{eq} = T_{sys} = -\frac{b}{a}. \quad \text{EQN. 5}$$

In internal calibration mode (hereinafter "calibration mode"), the full scale may be $$\Delta = T_{cal} \cdot \underline{(KB \cdot \tilde{G}\tilde{\mathcal{R}}\tilde{A}_{ro})} - \tilde{T}_{sys} \cdot KB \cdot \tilde{G}\tilde{\mathcal{R}}\tilde{A}_{ro} \quad \text{EQN. 6}$$

$$\tilde{y} = \tilde{x} \cdot \tilde{a} + \tilde{b}$$

where $T_{cal}$ denotes the equivalent noise temperature of the calibration signal and $\tilde{T}_{sys}$ denotes the temperature of the imager hardware at the time of calibration. Also this function zeros when $$T_{cal} = \tilde{T}_{sys} = -\frac{\tilde{b}}{\tilde{a}}. \quad \text{EQN. 7}$$

The absolute power (or equivalent temperature) of the calibration signals may be unknown and may vary with temperature and aging. In order to tie between (a, b) and ($\tilde{a}$, $\tilde{b}$) we therefore may perform the two calibrations—external and internal—one right after another, so that $T_{sys}=\tilde{T}_{sys}$ and the performances of all the elements along the detector do not change. As the internal calibration may be performed at two power levels (equal to equivalent noise temperatures $T_{cal,low}$ and $T_{cal,high}$), we denote n as the ratio between the two levels, namely $$n = \frac{T_{cal,high}}{T_{cal,low}} = \frac{P_{cal,high}}{P_{cal,low}}. \quad \text{EQN. 8}$$

where $P_{cal,low}$ and $P_{cal,high}$ denote the low and high power levels. The value of n may be determined by the implementation of the internal calibration signal source, therefore it may be known. Now, the calibration temperatures (which are mathematical quantities without physical existence) are given by $$T_{cal,low} = \frac{T_{sys}(\tilde{y}_1 - \tilde{y}_2)}{n\tilde{y}_1 - \tilde{y}_2}; \quad T_{cal,high} = n \cdot T_{cal,low}, \quad \text{EQN. 9}$$

where $\tilde{y}_1$ and $\tilde{y}_2$ are the readings of the internal calibration at the two power levels, and $T_{sys}$ may be derived from the external calibration data according to EQN. 5. Once $T_{cal,low}$ and $T_{cal,high}$ are known, $\tilde{a}$ and $\tilde{b}$ may be derived from the detector readings, for example, as a and b are derived for the external calibration.

In summary, by the end of the internal calibration in the factory, the following data are stored in memory per detector: a, b, $T_{cal,low}$, $T_{cal,high}$, $\tilde{a}$, $\tilde{b}$. In addition, the following data are stored per imager (or per segment): $T_{sys}$, n.

Note that $T_{sys}$ may be equal for all detectors. However, in practice the value of $T_{sys}$ derived by EQN. 5 may differ from one detector to another due to noise that introduces error to detector readings. In this case $T_{sys}$ may be averaged over all detectors to improve its precision.

After the imager delivery to the end user another internal calibration might be invoked to find the new polynomial coefficients (a and b) of each detector. Using the internal reference source at two power levels, each detector provides two readings, denoted $\tilde{\tilde{y}}_1$ and $\tilde{\tilde{y}}_2$. Combining $\tilde{\tilde{y}}_1$ and $\tilde{\tilde{y}}_2$ with $T_{cal,low}$ and $T_{cal,high}$ gives the per-detector polynomial coefficients of the new internal calibration, $\tilde{\tilde{a}}$ and $\tilde{\tilde{b}}$. The actual coefficients of each detector are now derived:

$$a_{new} = \tilde{a} \cdot \frac{a}{\tilde{a}} \; ; \; b_{new} = \frac{\tilde{b}}{\tilde{a}} \cdot a_{new}.$$ EQN. 9

From this point on the image may be corrected according to EQN. 1, replacing a with $a_{new}$ and b with $b_{new}$.

Simulation Results

Figure 6:
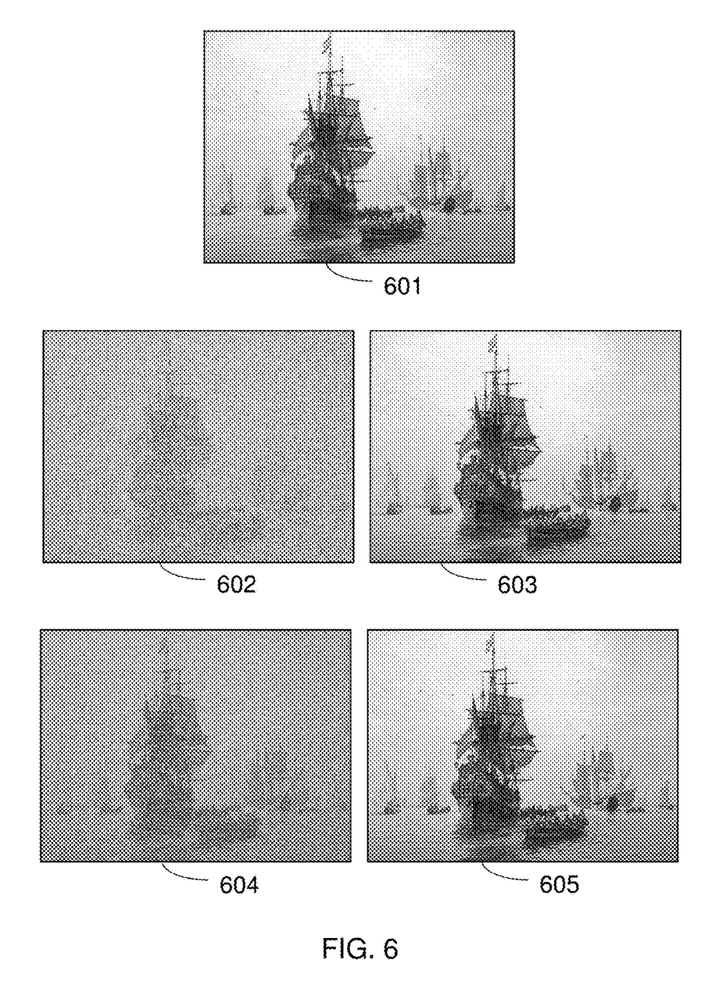
FIG. 6 shows simulated images with internal and external calibration.

Reference is now made to FIG. 6, which shows simulated images with internal and external calibration. Image 601 shows an original image for reference. Image 602 shows image 601 created by the raw data of the imager. Image 603 shows image 602 corrected by the external calibration, right after production. Image 604 shows image 601 after detector drift takes place. Image 605 shows image 604 after internal calibration that recalibrates the detector drift.

Conclusion

Several key features allow the proposed idea to be highly attractive:
The techniques may enable implementation of a staring passive radiometric imager.
The receiver structure is less complex than the classic design.
The performance of the receiver is less deteriorated compared to the classic design.
When electrical (either analog or digital) circuits and/or software are involved, implementation of the method is efficient.

Drawbacks of External Calibration

The external calibration process may require two uniform reference targets with regulated temperatures. Such reference targets may be installed in a production line for in-factory calibration. However, integrating temperature regulated reference targets into an imager, for detector drift calibration, complicates the mechanical design of the imager. Moreover, external calibration may be likely to disable the functionality of the imager for a long calibration time, which may impact the user experience.

Drawbacks of External Calibration with Embedded in Optics

The optics-embedded external calibration eliminates the need for separate mechanical targets. This significantly simplifies the mechanical design of the imager. However, there still are 3 drawbacks with an optics-embedded method:
(a) The optical design may be complicated as it may have to incorporate both uniquely structured optical elements and mode switching optics. The former may be a temperature regulated lens perimeter (or a non-regulated perimeter with temperature sensor), and the latter may be the optical elements that switch between standard imaging and calibration modes.
(b) Calibration may be made against a single target, contrary to the two targets required by the classic external calibration. Consequently, precise calibration may be difficult.
(c) Switching between imaging to calibration modes involves mechanical movements that are slow, compared to electronic high speed switching. As a result, the calibration process takes time that may interrupt the user experience, although not as much as the classic external calibration.

This method may be used for calibrating scanning imagers rather than staring imagers.

Drawbacks of Internal Calibration with SP5T and Temperature Sensor

The SP5T technique provides fast calibration as no mechanical elements are involved. However, drawbacks may include:
(a) The electrical design of the detector differs from the standard Dicke-switched design. Whilst the standard topology incorporates an SPDT switch, this topology makes use of an SP5T. The SP5T performance may be inferior to the SPDT due to the more complex structure of the switching for five elements. This results in considerably higher (worse) NETD of the detector.
(b) The external reference power may be calibrated for each detector individually.
(c) It may be unclear how temperature and aging affect the behavior of the cold and hot active loads, and whether the imager remains calibrated after delivery to the end user.
Following the above, this method may be used for calibrating scanning imagers rather than staring imagers.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for internal calibration of a detector, comprising:
   receiving a request for internal calibration of a detector comprising a switchable termination resistor;
   connecting electronically at least one internal calibration circuit to the switchable termination resistor;
   applying a plurality of input voltage signals to the detector from the at least one internal calibration circuit;
   measuring a plurality of output readings from the detector, each output reading corresponding to one of the plurality of input voltage signals;
   computing internal calibration coefficients based on the plurality of input voltage signals and the plurality of output readings; and
   calibrating output values of the detector based on the internal calibration coefficients, wherein the calibrating comprises a correction for detector drifts resulting from gain fluctuations.

2. The method according to claim 1, wherein the at least one internal calibration circuit is a noise source of different power levels for calibration.

3. The method according to claim 1, wherein the detector is an element of a staring array.

4. The method according to claim 3, wherein the staring array is a component of a passive radiometric imager.

5. The method according to claim 1, wherein at least some of the plurality of input voltage signals are noise signals.

6. A computer program product for internal calibration of a detector, the computer program product comprising a non-transitory computer-readable storage medium having program code embodied therewith, the program code executable by at least one hardware processor to:
   receive a request for internal calibration of a detector comprising a switchable termination resistor;

connect electronically at least one internal calibration circuit to the termination resistor;
apply a plurality of input voltage signals to the detector from the at least one internal calibration circuit;
measure a plurality of output readings from the detector, each output reading corresponding to one of the plurality of input voltage signals;
compute internal calibration coefficients based on the plurality of input voltage signals and the plurality of output readings; and
calibrate output values of the detector based on the internal calibration coefficients, wherein the calibrating comprises a correction for detector drifts resulting from gain fluctuations.

7. An imaging system comprising:
at least one detector comprising a switchable termination resistor;
at least one internal calibration circuit configured to electronically connect to the switchable termination resistor;
at least one hardware processor; and
a non-transitory computer-readable storage medium having program code embodied therewith, the program code executable by at least one hardware processor to:
receive a request for internal calibration,
connect electronically the at least one internal calibration circuit to the termination resistor,
apply a plurality of input voltage signals to the detector from the at least one internal calibration circuit,
measure a plurality of output readings from the detector, each output reading corresponding to one of the plurality of input voltage signals,
compute internal calibration coefficients based on the plurality of input voltage signals and the plurality of output readings, and
calibrate output values of the detector based on the internal calibration coefficients, wherein the calibrating comprises a correction for detector drifts resulting from gain fluctuations.

8. The imaging system according to claim 7, wherein the at least one internal calibration circuit is a noise source of different power levels for calibration.

9. The imaging system according to claim 7, wherein the detector is an element of a staring array.

10. The imaging system according to claim 9, wherein the program code is executed for a plurality of segment detectors of the staring array.

11. The imaging system according to claim 9, wherein the staring array is a component of a passive radiometric imager.

12. The imaging system according to claim 7, wherein at least some of the plurality of input voltage signals are noise signals.

13. The computer program product according to claim 6, wherein the at least one internal calibration circuit is a noise source of different power levels for calibration.

14. The computer program product according to claim 6, wherein the detector is an element of a staring array.

15. The computer program product according to claim 14, wherein the staring array is a component of a passive radiometric imager.

16. The computer program product according to claim 6, wherein at least some of the plurality of input voltage signals are noise signals.

17. A method for internal calibration of a detector:
(a) receiving a request for internal calibration of a detector comprising a switchable termination resistor;
(b) connecting electronically at least one internal calibration circuit to the switchable termination resistor;
(c) applying a plurality of input voltage signals to the detector from the at least one internal calibration circuit;
(d) measuring a plurality of output readings from the detector, each output reading corresponding to one of the plurality of input voltage signals;
(e) computing a first set of internal calibration coefficients based on the plurality of input voltage signals and the plurality of output readings;
(f) repeating steps (a) through (d), to compute a second set of internal calibration coefficients based on the plurality of input voltage signals and the plurality of output readings;
(g) retrieving external calibration coefficients; and
(h) correcting output values of the detector by replacing the external calibration coefficients with new calibration coefficients based on the equations:

$$a_{new} = \tilde{\tilde{a}} \cdot \frac{a}{\tilde{a}} \text{ and } b_{new} = \frac{\tilde{\tilde{b}}}{\tilde{a}} \cdot a_{new},$$

where $a_{new}$ and $b_{new}$ denote the new calibration coefficients, a and b denote the external calibration coefficients, $\tilde{a}$ and $\tilde{b}$ denote the first set of internal calibration coefficients, $\tilde{\tilde{a}}$ and $\tilde{\tilde{b}}$ denote the second set of internal calibration coefficients.

18. A computer program product for internal calibration of a detector, the computer program product comprising a non-transitory computer-readable storage medium having program code embodied therewith, the program code executable by at least one hardware processor to:
(a) receive a request for internal calibration of a detector comprising a switchable termination resistor;
(b) connect electronically at least one internal calibration circuit to the switchable termination resistor;
(c) apply a plurality of input voltage signals to the detector from the at least one internal calibration circuit;
(d) measure a plurality of output readings from the detector, each output reading corresponding to one of the plurality of input voltage signals;
(e) compute a first set of internal calibration coefficients based on the plurality of input voltage signals and the plurality of output readings;
(f) repeat steps (a) through (d), to compute a second set of internal calibration coefficients based on the plurality of input voltage signals and the plurality of output readings;
(g) retrieve external calibration coefficients; and
(h) correct output values of the detector by replacing the external calibration coefficients with new calibration coefficients based on the equations:

$$a_{new} = \tilde{\tilde{a}} \cdot \frac{a}{\tilde{a}} \text{ and } b_{new} = \frac{\tilde{\tilde{b}}}{\tilde{a}} \cdot a_{new},$$

where $a_{new}$ and $b_{new}$ denote the new calibration coefficients, a and b denote the external calibration coefficients, $\tilde{a}$ and $\tilde{b}$ denote the first set of internal calibration coefficients, $\tilde{\tilde{a}}$ and $\tilde{\tilde{b}}$ denote the second set of internal calibration coefficients.

19. An imaging system comprising:
at least one detector comprising a switchable termination resistor;
at least one internal calibration circuit configured to electronically connect to the switchable termination resistor;
at least one hardware processor; and
a non-transitory computer-readable storage medium having program code embodied therewith, the program code executable by at least one hardware processor to:
(a) receive a request for internal calibration,
(b) connect electronically the at least one internal calibration circuit to the termination resistor,
(c) apply a plurality of input voltage signals to the detector from the at least one internal calibration circuit,
(d) measure a plurality of output readings from the detector, each output reading corresponding to one of the plurality of input voltage signals,
(e) compute a first set of internal calibration coefficients based on the plurality of input voltage signals and the plurality of output readings,
(f) repeat steps (a) through (d), to compute a second set of internal calibration coefficients based on the plurality of input voltage signals and the plurality of output readings,
(g) retrieve external calibration coefficients, and
(h) correct output values of the detector by replacing the external calibration coefficients with new calibration coefficients based on the equations:

$$a_{new} = \tilde{\tilde{a}} \cdot \frac{a}{\tilde{a}} \text{ and } b_{new} = \frac{\tilde{\tilde{b}}}{\tilde{\tilde{a}}} \cdot a_{new},$$

where $a_{new}$ and $b_{new}$ denote the new calibration coefficients, a and b denote the external calibration coefficients, $\tilde{a}$ and $\tilde{b}$ denote the first set of internal calibration coefficients, $\tilde{\tilde{a}}$ and $\tilde{\tilde{b}}$ denote the second set of internal calibration coefficients.

* * * * *